A. A. PATHI.
Cigar Pipe.
No. 82,743.
Patented Oct. 6, 1868.
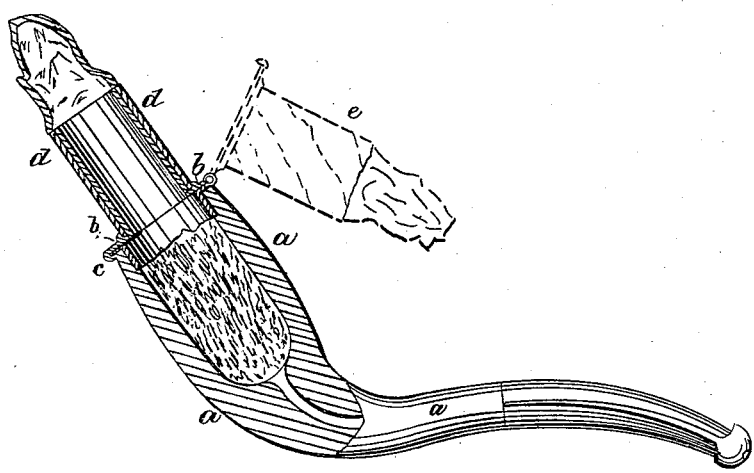

United States Patent Office.

ADOLPHE ACHILLE PATHI, OF PARIS, FRANCE.

Letters Patent No. 82,743, dated October 6, 1868.

CIGAR-PIPE.

*The Schedule referred to in these Letters Patent and making part of the same.*

TO ALL WHOM IT MAY CONCERN:

Be it known that I, ADOLPHE ACHILLE PATHI, of Paris, France, have invented "a new form of Smoking-Pipe, so-called Cigar-Pipe;" and I do hereby declare that the following is a full, clear, and exact description thereof, which will enable others skilled in the art to make and use the same, reference being had to the accompanying drawing, forming a part of this specification.

This invention relates to smoking-pipes for tobacco, and has for its object to provide a pipe that will have the outward resemblance of a cigar-holder wherein a cigar is being smoked.

To this end, I take a smoking-pipe, of any form and material used for the purpose, on the bowl of which I erect a lid having a tubular prolongation resembling an ignited cigar. I stuff this new pipe with tobacco, and after lighting it and putting the lid on, I can use this new article as an ordinary smoking-pipe.

I have, in the accompanying drawing, represented my so-called cigar-pipe.

$a$ is a bowl, of any form and material.

$b$ is the lid, hinged or otherwise attached to the bowl, and provided with a little clasp, $b'$, and a prolongation, $d$.

The prolongation of this lid, which counterfeits and has the aspect of a partly-burned cigar still in ignition, is perforated with a number of holes for the admission of external air.

This lid, in the drawing, is shown at $e$, and lowered down for the purpose of stuffing the pipe with tobacco and lighting it.

Having thus described my invention, I claim as new, and desire to secure by Letters Patent—

A tobacco-pipe, having a lid, $b$, provided with a prolongation, $d$, terminating at the outer end in a form resembling a burning cigar, and perforated for the admission of air to support the combustion of the tobacco, substantially as and for the purpose described.

PATHI.

Witnesses:
    F. OLCOTT,
    DEMOS.